No. 637,515. Patented Nov. 21, 1899.
B. LOUTZKY.
MEANS FOR TRANSMITTING MOTION.
(Application filed June 2, 1899.)
(No Model.)
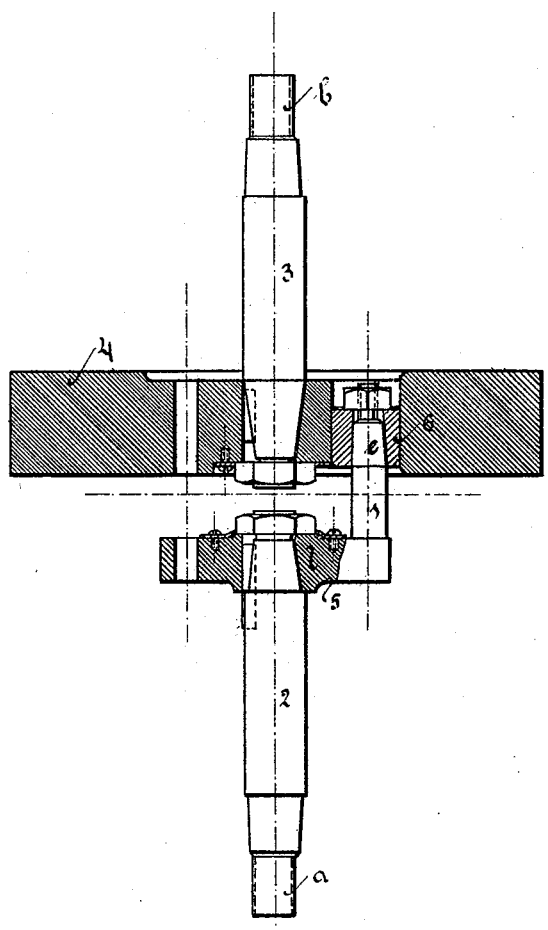

UNITED STATES PATENT OFFICE.

BORIS LOUTZKY, OF BERLIN, GERMANY.

MEANS FOR TRANSMITTING MOTION.

SPECIFICATION forming part of Letters Patent No. 637,515, dated November 21, 1899.

Application filed June 2, 1899. Serial No. 719,081. (No model.)

*To all whom it may concern:*

Be it known that I, BORIS LOUTZKY, a subject of the Emperor of Russia, residing at Berlin, Germany, have invented certain new and useful Improvements in Means for Transmitting Motion, of which the following is a full, clear, and exact description, reference being had to the accompanying drawing, forming part hereof.

The figure of the drawing is a plan view, partly in section, of a sufficient number of parts to illustrate my invention.

In motors wherein great velocity is imparted to the main shaft it is advantageous to give at least to the crank-pin a hardened wearing-surface in order to reduce the wear of the same to the smallest extent. As the said shaft as a rule is provided with portions extending at right angles, it is obvious in order to allow the pressure exerted on the crank-pins to be distributed on the ends of journals $a$ and $b$ in such a way as to favorably load the shaft the hardening of the pins can only be undertaken with considerable difficulty on account of the possibility of warping the shafts, and thereby altering the axial position of the shaft ends or journals.

This invention, which is shown in the accompanying drawing, has for its object to remove this drawback and to form such a shaft of separate parts in such a manner as to obtain an absolutely solid connection between the hardened crank-pins 1 and the two sections 2 and 3 of the shaft, which lie axially to one another and parallel with the pin 1, as will hereinafter appear. The pin 1 is preferably formed in one piece with the arm 5 and when turned down is hardened and ground along the full extent of its wearing-surface. The tapered end $e$ is then fitted in the other part of the crank which has remained soft and which is bored exactly parallel to the crank-pin, and the connection between the section of the shaft 2 and the arm 5 is effected by means of wedges and screws. The fly-wheel 4, which is preferably of cast-iron, is employed as means of connection between the pin 1 and the section 3 of the shaft.

The main difficulty consists in uniting the shaft-section 3 with sufficient firmness to the tapering end $e$ of the pin 1. In rapid-running machines, more particularly on four-stroke explosion-motors, the direct attachment in the cast-iron body is never sufficient. The pin, even where a wedge and screwing are both employed, soon becomes loose, so that by mutual warping or a displacement of the sections 2 and 3 of the shaft the machine may come to a standstill. In order to remove this drawback, the parts are mounted in the manner hereinbefore described, and a steel bush 6 is let into the body of the wheel 4 at the point of attachment and is firmly keyed thereto. This bush is very suitable, by reason of its somewhat considerable diameter, for receiving the high pressure or strain without damage to the fastening and to convey the same to the boring in the much softer cast-iron. By reason of the greater hardness of the bush it is better suited to render possible a secure holding of the end $e$ of the crank-pin 1 in the tapering bore of said bush.

Having now particularly described and ascertained the nature of the said invention and in what manner the same is to be performed, I declare that what I claim is—

In a device for transmitting motion, the combination of a shaft made up of a plurality of sections, an arm carried by one of said sections, a hardened tapering crank-pin carried by said arm, a fly-wheel carried by another section of said shaft and having an aperture and a hardened bushing seated in said aperture, which bushing is adapted to receive the tapering end of the pin to connect the shaft-sections.

In witness whereof I have hereunto set my hand in presence of two witnesses.

BORIS LOUTZKY.

Witnesses:
HENRY HASPER,
WALDEMAR HAUPT.